United States Patent [19]

Zondler et al.

[11] 3,855,157

[45] Dec. 17, 1974

[54] CURABLE MIXTURES OF EPOXIDE RESINS AND PIPERIDINE DERIVATIVES

[75] Inventors: Helmut Zondler, Allschwil, Switzerland; Wolfgang Pfleiderer, Konstanz, Germany

[73] Assignee: Ciba-Geigy AG, Basel, Switzerland

[22] Filed: Sept. 6, 1973

[21] Appl. No.: 394,956

Related U.S. Application Data

[63] Continuation-in-part of Ser. No. 325,462, Jan. 22, 1973, abandoned, which is a continuation of Ser. No. 133,445, April 12, 1971, abandoned.

[30] Foreign Application Priority Data

Apr. 13, 1970 Switzerland.......................... 5452/70

[52] U.S. Cl........ 260/2 N, 106/163 R, 117/161 ZB, 161/184, 260/9, 260/13, 260/18 EP, 260/19 EP, 260/21, 260/28, 260/29.2 EP, 260/30.4 EP, 260/30.6 R, 260/31.2 R, 260/31.6, 260/32.8, 260/33.2 EP, 260/33.4 EP, 260/33.6 EP, 260/37 EP, 260/47 EN, 260/59, 260/77.5 NC, 260/79, 260/78.4 EP, 260/293.52, 260/836

[51] Int. Cl............................................. C08g 30/14
[58] Field of Search......... 260/2 N, 59, 78.4 EP, 79, 260/77.5, 47 EN, 293.51, 293.52

[56] References Cited
UNITED STATES PATENTS

| 2,965,609 | 12/1960 | Newey................................. 260/47 |
| 3,544,590 | 12/1970 | Kittleson.......................... 260/326.5 |
| 3,717,593 | 2/1973 | Zondler et al...................... 260/2 N |

*Primary Examiner*—Melvin Goldstein
*Assistant Examiner*—T. Pertilla

[57] ABSTRACT

Curable moulding, coating and adhesive compositions which contain a polyepoxide compound, for example a liquid polyglycidyl ether of bisphenol A, and 3,3-bis-(γ-aminopropyl)-piperidine or 2-methyl-3,3-bis-(γ-aminopropyl)-piperidine as the curing agent. The curing of the moulding compositions can be effected in the temperature range of 20° – 150°C. The mouldings possess good flexural strengths and deflections and are distinguished by exceptionally outstanding heat distortion.

9 Claims, No Drawings

CURABLE MIXTURES OF EPOXIDE RESINS AND PIPERIDINE DERIVATIVES

This application is a continuation-in-part-application of copending application Ser. No. 325,462, filed Jan. 22, 1973 and now abandoned, which in turn is a continuation application of our copending application Ser. No. 133,445, filed Apr. 12, 1971 and now abandoned.

The subject of the present invention are curable mixtures which are suitable for the manufacture of mouldings, impregnations, coatings and adhesive bonds, and which are characterised in that they contain (a) a polyepoxide compound with an average of more than one epoxide group in the molecule and (b) as the curing agent, a 3,3-bis-($\gamma$-aminopropyl)-piperidine of the general formula

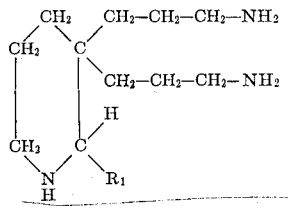
(I)

wherein $R_1$ represents a hydrogen atom or the methyl radical.

The 3,3-bis-($\gamma$-aminopropyl)-piperidines of the formula (I), newly proposed as curing agents for epoxide resins, are water-clear liquids of very low viscosity. They show a series of important and surprising advantages over the known amine curing agents.

Thus it was hitherto generally not possible to obtain mouldings of good mechanical properties and outstanding values for heat distortion when curing an epoxide resin with a polyamine. The new amines of the present invention fill this gap, in that the epoxide resins cured with them possess improved values for heat distortion.

A particularly advantageous factor is the lower viscosity of the curable mixtures as compared to the hitherto customary polyamine/epoxide resin mixtures, which has a particularly favourable effect when the mixtures are employed as solvent-free coating materials. The piperidine derivatives of the fourmla (I) can be manufactured according to various methods.

3,3-bis-($\gamma$-aminopropyl)-piperidines of the formula (I) proposed as curing agents can be manufactured if decahydro-1,8-naphthyridines of the general formula

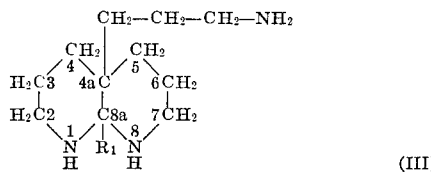
(III)

wherein $R_1$ represents the methyl group or a hydrogen atom, are catalytically hydrogenated whilst splitting the ring.

The hydrogenation can be carried out according to the known methods, using the customary catalysts, but preferably platinum catalysts, especially platinum deposited on active charcoal, are used as hydrogenation catalysts.

The decahydro-1,8-naphthyridines of the formula (III) used as starting substances can be manufactured in different ways. 8a-methyl-4a-($\gamma$-aminopropyl)-decahydro-1,8-naphthyridine is prepared by catalytic hydrogenation of tri-($\beta$-cyanoethyl)-acetone using Raney-nickel or Raney-cobalt as catalyst. 4a-($\gamma$-aminopropyl)-decahydro-1,8-naphthyridine can be manufactured if cyanoethylated acetals of the formula

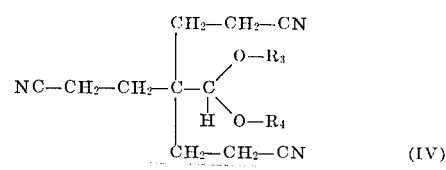
(IV)

wherein $R_3$ and $R_4$ separately each denote a radical of a monohydric alcohol obtained by separating off the hydroxyl group, or together denote the radical of a dialcohol obtained by separating off both hydroxyl groups, are hydrogenated to give the aminoacetals of the formula

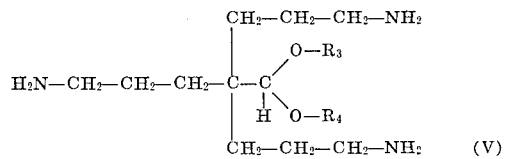
(V)

The aminoacetals of the formula (V) are then hydrolised under acid conditions, and the cyclisation to give the 4a-($\gamma$-aminopropyl)-decahydro-1,8-naphthyridine is then effected by treatment with strong alkalis, such as NaOH or KOH.

For instance ethylene glycol-acetal of 2,2,2-tris-($\gamma$-aminopropyl)-acetaldehyde according to formula (V) can be used as starting material. This compound can be manufactured according to Example 3(d) of the U.S. Pat. No. 3,714,196.

Appropriately, 0.5 to 1.3 equivalents, preferably approx. 1.0 equivalent, of nitrogen-bonded active hydrogen atoms of the 3,3-bis-($\gamma$-aminopropyl)-piperidine of the formula (I) are used per 1 equivalent of epoxide groups of the polyepoxide compound (a) in the curable mixtures according to the invention.

Possible polyepoxide compounds (a) are above all those having an average of more than one glycidyl group, $\beta$-methylglycidyl group or 2,3-epoxycyclopentyl group bonded to a hetero atom (for example sulphur, preferably oxygen or nitrogen); in particular, there may be mentioned bis-(2,3-epoxycyclopentyl)-ether; diglycidyl ethers or polyglycidyl ethers of polyhydric aliphatic alcohols, such as 1,4-butanediol, or polyalkylene glycols, such as polypropylene glycols; diglycidyl or polyglycidyl ethers of cycloaliphatic polyols, such as 2,2-bis-(4-hydroxy-cyclohexyl)propane; diglycidyl or polyglycidyl ethers of polyhydric phenols, such as resorcinol, bis-(p-hydroxyphenyl)methane, 2,2-bis(p- hydroxyphenyl)-propane (=diomethane), 2,2-bis(4'-hydroxy-3',5',-dibromophenyl)propane, 1,1,2,2,-tetrakis-(p-hydroxylphenyl) ethane, or of condensation products of phenols with formaldehyde obtained under acid conditions, such as phenol novolacs and cresol novolacs; di- or poly-($\beta$-methylglycidyl)-ethers of the abovementioned polyhydric alcohols or polyhydric phenols; polyglycidyl esters of polybasic carboxylic acids, such as phthalic acid, terephthalic acid, $\Delta^4$-tetrahydrophthalic acid and hexahydrophthalic acid; N-glycidyl derivatives of amines, amides and heterocyclic nitrogen bases, such as N,N-diglycidyl-aniline, N,N-diglycidyl-toluidine, N,N,N',N'-tetraglycidyl-bis(p-aminophenyl)-methane; triglycidyl-isocyanurate; N,N-diglycidyl-ethyleneurea; N,N'-diglycidyl-5,5-dimethyl-hydantoin, N,N'-diglycidyl-5-isopropyl-hydantoin; N,N'-diglycidyl-5,5-dimethyl-6-isopropyl-5,6-dihydro-uracil.

If desired, active diluents such as, for example, styrene oxide, butyl glycidyl ether, isooctyl glycidyl ether, phenyl glycidyl ether, cresyl glycidyl ether, and glycidyl esters of synthetic, highly branched, mainly tertiary aliphatic monocarboxylic acids ("CARDURA E") can be added to the polyepoxides to reduce the viscosity.

The curing of the curable mixtures according to the invention to give mouldings and the like is appropriately effected in the temperature range of 20° to 150°C. The curing can also be carried out in a known manner in two or more stages, in which case the first curing stage is carried out at a lower temperature and the post-curing at a higher temperature.

The curing can, if desired, also be carried out in two stages in such a way that the curing reaction is firstly prematurely stopped and/or the first stage is carried out at room temperature or only slightly elevated temperature, whereby a curable precondensate (so-called "B-stage") which is still fusible and soluble is obtained from the epoxide component (a) and the amine curing agent (b). Such a precondensate can for example serve for the manufacture of "prepregs", compression moulding compositions or, especially, sintering powders.

In order to shorten the geling times or curing times, known accelerators for the amine curing reaction, for example monophenols or polyphenols, such as phenol or diomethane, salicylic acid, tertiary amines or salts of thiocyanic acid, such as NH$_4$SCN, can be added.

The term "curing", as used here, denotes the conversion of the soluble, either liquid or fusible, polyepoxides into solid, insoluble and infusible, three-dimensionally crosslinked products or materials, and in particular, as a rule, with simultaneous shaping to give mouldings such as castings, pressings, laminates and the like or "sheet-like structures" such as coatings, lacquer films or adhesive bonds.

The curable mixtures according to the invention of polyepoxide compounds (a) and 3,3-bis-($\gamma$-aminopropyl)-piperidines of the formula (I) used as curing agents can furthermore be mixed, in any stage before curing, with customary modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention there may, for example, be mentioned: coal tar, bitumen, textile fibres, glass fibres, asbestos fibres, boron fibres, carbon fibres, cellulose, polyethylene powder and polypropylene powder; quartz powder; mineral silicates, such as mica, asbestos powder and slate powder; kaolin, aluminium oxide trihydrate, chalk powder, gypsum, antimony trioxide, bentones, silica aerogel ("AEROSIL"), lithopone, barytes, titanium dioxide, carbon black, graphite, oxide pigments, such as iron oxide, or metal powders, such as aluminium powder or iron powder.

Suitable organic solvents for modifying the curable mixtures are, for example, toluene, xylene, n-propanol, butyl acetate, acetone, methyl ethyl ketone, diacetone-alcohol, ethylene glycol monomethyl ether, monoethyl ether and monobutyl ether.

Dibutyl phthalate, dioctyl phthalate and dinonyl phthalate, tricresyl phosphate, trixylenyl phosphate and also polypropylene glycols can for example be used as plasticisers for modifying the curable mixtures.

Silicones, cellulose acetobutyrate, polyvinyl butyral, waxes, stearates and the like (which are in part also used as mould release agents) can be added as flow control agents when employing the curable mixtures, particularly for surface protection.

Particularly for use in the lacquer field, the polyepoxide compounds can furthermore be partially esterified in a known manner with carboxylic acids, such as, especially, higher unsaturated fatty acids. It is furthermore possible to add other curable synthetic resins, such as for example phenoplasts or aminoplasts, to such lacquer resin formulations.

The manufacture of the curable mixtures according to the invention can be carried out in the usual manner with the aid of known mixing equipment (stirrers, kneaders, rolls and the like).

The curable epoxide resin mixtures according to the invention are above all employed in the fields of surface protection, the electrical industry, laminating processes and the building industry. They can be employed in a formulation adapted in each case to the special end use, in the unfilled or filled state, optionally in the form of solutions or emulsions, as paints, lacquers, sintering powders, compression moulding compositions, injection moulding formulations, dipping resins, casting resins, impregnating resins, binders and adhesives, tool resins, laminating resins, sealing and filling compositions, floor covering compositions and binders for mineral aggregates.

The most important industrial uses lie in the field of casting resins, adhesives and surface protection.

In the examples which follow, unless otherwise stated, parts denote parts by weight and percentages denote percentages by weight. The relationship of parts by volume to parts by weight is as of the millilitre to the gram.

The following epoxide resins were used for the manufacture of curable mixtures described in the examples:

EPOXIDE RESIN A

Polyglycidyl ether resin (technical product) manufactured by condensation of diomethane (2,2-bis-[p-hydroxyphenyl]-propane) with a stoichiometric excess of epichlorohydrin in the presence of alkali, which is liquid at room temperature, consists mainly of diomethane-diglycidyl ether of the formula

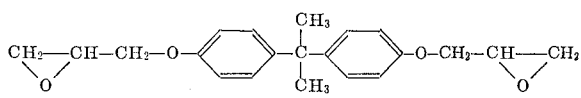

and has the following characteristics:
Epoxide content: 5.1 – 5.5 epoxide equivalents/kg
Viscosity (Hoeppler) at 25°C: 9,000 – 13,000 cP.

EPOXIDE RESIN B

Polyglycidyl ether resin (technical product) manufactured by condensation of hydrogenated diomethane [2,2-bis-(p-hydroxycyclohexyl)-propane] with a stoichiometric excess of epichlorohydrin in the presence of alkali, which is liquid at room temperature, consists mainly of diomethane-diglycidyl ether of the formula

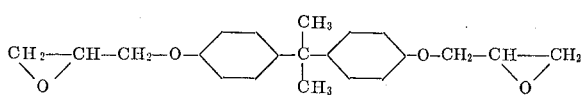

and has the following characeristics:
Epoxide content: 4.9 epoxide equivalents/kg
Viscosity (Hoeppler) at 25°C: 1,250 cP.

EPOXIDE RESIN C

Tetrahydrophthalic acid diglycidyl ester having the following characteristics:
Epoxide content: 6.45 equivalents/kg
Viscosity (Hoeppler) at 25°C: 450 – 550 cP.

To determine the mechanical and electrical properties of the curable mixtures described in the example which follow, sheets of size 135 × 135 × 4 mm were manufactured for the determination of the flexural strength, deflection and the test specimens corresponding to the standard specifications were machined from these sheets.

Manufacture of 3,3-Bis-(γ-Aminopropyl)-Piperidines

I. 2-methyl-3,3-Bis-(γ-Aminopropyl)-Piperidine 73,8 g of 8a-methyl-4a-(γaminopropyl)-decahydro-1,8-naphthyridine in 250 ml of ethanol are hydrogenated with 2.0 g of platinum-charcoal catalyst (5% of platinum on active charcoal) in a duck-shaped shaking vessel at room temperature. The hydrogen absorption stops after 4 days. The catalyst is filtered off, and the solvent is removed in vacuo and fractionated through a column. 54.4 g of 2-methyl-3,3-bis-(γ-aminopropyl)-piperdine of boiling point 184.5 -185.5°C/9 mm Hg are obtained.

| Analysis: | $C_{12}H_{27}N_3$ (M = 213.37) | | |
|---|---|---|---|
| Calculated: | C 67.55 | H 12.75 | N 19.70 |
| Found: | C 67.73 | H 13.02 | N 19.58 |

NMR spectrum in $D_2O$:

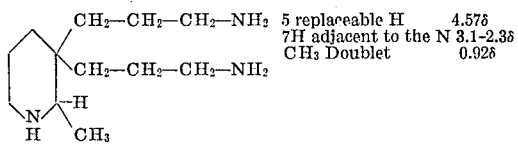

II. 3,3-Bis-(γ-Aminopropyl)-Piperidine a. 4a-(γ-aminopropyl)-decahydro-1,8-naphthyridine, 109g 2,2,2-tris-(γ-aminopropyl)-acetaldehyde-gly-colacetal are dissolved in 200 ml $H_2O$, acidified with 120 ml conc. HCl and the mixture boiled for 30 minutes. After cooling solid KOH is added and the alkaline solution is extracted with chloroform. The solution is evaporated to remove the solvent, and the residue is fractionated through a 40 cm packed column.

Yield 62.1 g (74.8% the theoretical yield) of boiling point 162 – 165°C/6 mm Hg.

| Analysis: | $C_{11}H_{23}N_3$ (M = 197,33) | | |
|---|---|---|---|
| Calculated: | C 66,96 | H 11,75 | 21,29 |
| Found: | C 67,38 | H 11,73 | N 22,05 | b. 20.0 g of 4a-(γ-aminopropyl)-decahydro-1,8-naphthyridine in 300 ml of ethanol are hydrogentated with 1.0 g of 5 % strength platinum on active charcoal in an autoclave at 100°C and 70 atmospheres gauge pressure of $H_2$, for 20 hours. The mixture is filtered, the solvent is removed on a rotary evaporator and the residue is fractionated through a spinning band column.

Yield: 16.2 g (80.4 % of the theoretical yield) of boiling point 178°–183°C/10 mm Hg.

The NMR spectrum in $CCl_4$ is directly comparable with that of 3-Methyl-3-(γ-aminopropyl)-piperidine (see under I).

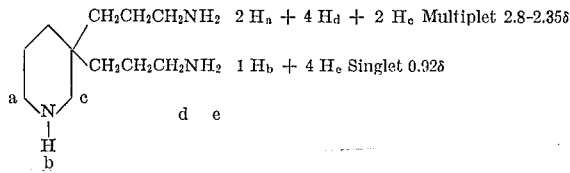

CURABLE MIXTURES

Example 1

A mixture of 66.5 parts by weight of epoxide resin A and 14,0 parts by weight of 3,3-bis-(γ-aminopropyl)-piperidine is degased, poured into a mould of size 140 × 140 × 4 mm prewarmed to 40°C, and subsequently cured for 4 hours at 80°C and 12 hours at 140°C.

The following mixtures are prepared and cured analogously to the description given in example 1, using an equivalent ratio of epoxide groups to active nitrogen-bonded H atoms = 1,0:1,0. 1,0.

Example 2

66.0 parts epoxide resin A and 14.0 parts 2-methyl-3,3-bis-(γ-aminopropyl)-piperidine.

Example 3

74,0 parts epoxide resin B and 14,1 parts 2-methyl-3,3-bis-(γ-aminopropyl)-piperidine.

Example 4

49,0 parts epoxide resin C and 13,4 parts 2-methyl-3,3-bis-(γ-aminopropyl)-piperidine.

COMPARISON EXPERIMENTS

The 3,3-bis-(γ-aminopropyl)-piperidines having formula I are compared with compounds having in 3-position of the piperidine ring only one instead of two γ-aminopropyl-groups.

Example 5

63 parts epoxide resin A and 18.8 parts 2.3-dimethyl-3-(γ-aminopropyl)-piperidine.

Example 6

63 parts epoxide resin A and 15.3 parts 3-methyl-3(γ-aminopropyl)-piperidine.

Example 7

189 parts epoxide resin A and 65.3 parts 2-methyl-3isopropenyl-3-(γ-aminopropyl)-piperidine.

Example 8

80 parts epoxide resin A and 29.5 parts 2-methyl-3isobutyl-3-(γ-aminopropyl)-piperidine

Example 9

83 parts epoxide B and 26.1 parts 2-methyl-3-isobutyl3-(γ-aminopropyl)-piperidine.

Example 10

81 parts epoxide resin C and 36.3 parts 2-methyl-3-isobutyl-3-(γ-aminopropyl)-piperidine.

| Example | HDP °C | FS$_2$ kg/mm | DF mm |
|---|---|---|---|
| 1 | — | 14.8 | 9.7 |
| 2 | 160 | 13.4 | 8.3 |
| 3 | 75 | 12.1 | 8.1 |
| 4 | 103 | 13.8 | 5.0 |
| 5 | 95 | 11,4 | 19,0 |
| 6 | 93 | 13,5 | 17,0 |
| 7 | 117 | 12,9 | 14,0 |
| 8 | 104 | 12,8 | >20,0 |
| 9 | 61 | 11,1 | 5,6 |
| 10 | 71 | 12,6 | 6,0 |

Explanation of symbols:
HDP Heat distortion point according to DIN 53,461
FS Flexural strength according to VSM 77,103
DF Deflection according to VSM 77,103

What is claimed is:

1. A composition of matter which comprises (a) a 1,2-polyepoxide compound with an average of more than one epoxide group in the molecule and (b) as the curing agent, a 3,3-bis-(γ-aminopropyl)-piperidine of the general formula $$\begin{array}{c}CH_2\quad CH_2-CH_2-CH_2-NH_2\\CH_2\diagdown C\diagup\\ \quad\quad\diagdown CH_2-CH_2-CH_2-NH_2\\ \quad\quad H\\CH_2\diagdown C\diagup\\ N\quad R_1\\H\end{array}\qquad(I)$$

wherein $R_1$ represents a hydrogen atom or a methyl group.

2. A composition as claimed in claim 1, which contains 2-methyl-3,3-bis-(γ-aminopropyl)-piperidine as the curing agent (b).

3. A composition as claimed in claim 1, which contains 3,3-bis-(γ-aminopropyl)-piperidine as the curing agent (b).

4. A composition as claimed in claim 1, which contains a polyepoxide compound (a) with an average of more than one glycidyl group, β-methyl glycidyl group or 2,3-epoxycyclopentyl group, bonded to a heteroatom, in the molecule.

5. A composition as claimed in claim 1, which contains a polyglycidyl ether of a polyhydric phenol as the polyepoxide compound (a).

6. A composition as claimed in claim 5, which contains a polyglycidyl ether of 2,2-bis-(p-hydroxyphenyl)-propane as the polyepoxide compound (a).

7. A composition as claimed in claim 1, which contains a polyglycidyl ether of a cycloaliphatic polyol as the polyepoxide compound (a).

8. A composition as claimed in claim 7, which contains the diglycidyl ether of 2,2-bis-(4'-hydroxycyclohexyl)-propane as the polyepoxide compound (a).

9. A composition as claimed in claim 1, which contains tetrahydrophthalic acid diglycidyl ester as the polyepoxide compound (a).

* * * * *